(12) United States Patent
Oh et al.

(10) Patent No.: US 11,136,711 B2
(45) Date of Patent: Oct. 5, 2021

(54) METHOD FOR PREPARING CARBON NANOTUBE FIBER AND CARBON NANOTUBE FIBER PREPARED THEREBY

(71) Applicant: LG Chem, Ltd., Seoul (KR)

(72) Inventors: Eu Gene Oh, Daejeon (KR); Ji Eun Kim, Daejeon (KR); Mi Jin Lee, Daejeon (KR); Jae Hong Lee, Daejeon (KR); Ju Han Kim, Daejeon (KR); Won Jong Kwon, Daejeon (KR); Won Jae Lee, Daejeon (KR); Jin Kyu Lee, Daejeon (KR)

(73) Assignee: LG Chem, Ltd.

( * ) Notice: Subject to any disclaimer, the term of this patent is extended or adjusted under 35 U.S.C. 154(b) by 170 days.

(21) Appl. No.: 16/320,308

(22) PCT Filed: Jan. 24, 2018

(86) PCT No.: PCT/KR2018/001072
§ 371 (c)(1),
(2) Date: Jan. 24, 2019

(87) PCT Pub. No.: WO2018/143602
PCT Pub. Date: Aug. 9, 2018

(65) Prior Publication Data
US 2019/0271100 A1 Sep. 5, 2019

(30) Foreign Application Priority Data
Feb. 3, 2017 (KR) .................. 10-2017-0015343

(51) Int. Cl.
*D01F 11/12* (2006.01)
*D01F 9/12* (2006.01)
(Continued)

(52) U.S. Cl.
CPC ........... *D06M 11/74* (2013.01); *C01B 32/162* (2017.08); *C01B 32/168* (2017.08);
(Continued)

(58) Field of Classification Search
CPC . D01F 9/127; D01F 9/12; D01F 11/12; C01B 32/16; C01B 32/168; C01B 32/178;
(Continued)

(56) References Cited

U.S. PATENT DOCUMENTS

| 2014/0001417 A1 | 1/2014 | Kim et al. |
| 2015/0038041 A1 | 2/2015 | Zhamu et al. |

(Continued)

FOREIGN PATENT DOCUMENTS

| CN | 101723350 A | 6/2010 |
| CN | 101857460 A | 10/2010 |

(Continued)

OTHER PUBLICATIONS

Machine English translation of CN106337215 (2016).*
(Continued)

*Primary Examiner* — Richard M Rump
(74) *Attorney, Agent, or Firm* — Lerner, David, Littenberg, Krumholz & Mentlik, LLP

(57) ABSTRACT

The present invention relates to a carbon nanotube fiber and methods for preparing the same. In one embodiment, a method for preparing a carbon nanotube fiber comprises reacting a carbon source in the presence of a catalyst and a catalytic activator to form carbon nanotube aggregates, contacting the carbon nanotube aggregates with graphene oxide, and forming the carbon nanotube aggregates in contact with the graphene oxide into a carbon nanotube fiber.

5 Claims, 1 Drawing Sheet

(51) Int. Cl.

| | | |
|---|---|---|
| *C01B 32/198* | (2017.01) | |
| *D06M 11/74* | (2006.01) | |
| *C01B 32/162* | (2017.01) | |
| *C01B 32/178* | (2017.01) | |
| *D01D 10/02* | (2006.01) | |
| *D06M 23/08* | (2006.01) | |
| *C01B 32/168* | (2017.01) | |
| *B82Y 30/00* | (2011.01) | |
| *B82Y 40/00* | (2011.01) | |

(52) U.S. Cl.
CPC .......... *C01B 32/178* (2017.08); *D01D 10/02* (2013.01); *D01F 9/12* (2013.01); *D01F 11/12* (2013.01); *D06M 23/08* (2013.01); *B82Y 30/00* (2013.01); *B82Y 40/00* (2013.01); *C01B 32/198* (2017.08); *C01B 2202/08* (2013.01); *C01B 2202/10* (2013.01); *C01B 2202/26* (2013.01); *C01P 2004/13* (2013.01)

(58) Field of Classification Search
CPC . C01B 32/162; C01B 32/198; C01B 2202/26; C01B 2202/10; C01B 2202/08; D06M 11/74; D06M 23/08; D01D 10/02; C01P 2004/13; B82Y 40/00; B82Y 30/00
See application file for complete search history.

(56) References Cited

U.S. PATENT DOCUMENTS

| | | |
|---|---|---|
| 2015/0110704 A1 | 4/2015 | Jeong et al. |
| 2015/0360947 A1 | 12/2015 | Lin et al. |
| 2017/0044689 A1 | 2/2017 | Lee et al. |
| 2017/0306529 A1 | 10/2017 | Oh et al. |
| 2019/0040550 A1* | 2/2019 | Han ................ D01F 9/12 |

FOREIGN PATENT DOCUMENTS

| | | | |
|---|---|---|---|
| CN | 103614810 A * | 3/2014 | |
| CN | 103628183 A | 3/2014 | |
| CN | 105047427 A | 11/2015 | |
| CN | 105197874 A | 12/2015 | |
| CN | 106337215 A | 1/2017 | |
| JP | 2007536434 A | 12/2007 | |
| KR | 20120090383 A | 8/2012 | |
| KR | 101182380 B1 | 9/2012 | |
| KR | 101296809 B1 | 8/2013 | |
| KR | 20140071793 A | 6/2014 | |
| KR | 101423757 B1 | 8/2014 | |
| KR | 101484090 B1 | 1/2015 | |
| KR | 20150120250 A | 10/2015 | |
| KR | 20160038724 A | 4/2016 | |
| KR | 20160062810 A | 6/2016 | |
| KR | 101704246 B1 | 2/2017 | |
| WO | 2012108607 A1 | 8/2012 | |
| WO | 2015160041 A1 | 10/2015 | |
| WO | 2017018766 A1 | 2/2017 | |

OTHER PUBLICATIONS

Jung, Yeonsu, et al. "Controlling the crystalline quality of carbon nanotubes with processing parameters from chemical vapor deposition synthesis." Chemical engineering journal 228 (2013): 1050-1056.*

Meng, Fancheng, et al. "Multifunctionalization of carbon nanotube fibers with the aid of graphene wrapping." Journal of Materials Chemistry 22.32 (2012): 16277-16282.*

Li, Q. W., et al. "Sustained growth of ultralong carbon nanotube arrays for fiber spinning." Advanced Materials 18.23 (2006): 3160-3163.*

Chen, Xuelong, et al. "Controlled thermal functionalization for dispersion enhancement of multi-wall carbon nanotube in organic solvents." Journal of materials science 51.12 (2016): 5625-5634.*

Search Report from Chinese Office Action for Application No. 201880003136.4 dated Nov. 2, 2020; 3 pages.

Li lixiang et al., "The effect of carbonyl, carboxyl and hydroxyl groups on the capacitance of carbon nanotubes", New Carbon Materials, vol. 26, No. 3, Jun. 15, 2011, pp. 224-228.

Jin Shao et al., "Characterization of functionalized carbon nanotubes by raman and IR spectroscopy and acid-base titrations", Journal of Beijing University of Chemical Technology(Natural Science), vol. 37, No. 6, Jan. 20, 2010, pp. 55-59.

Search report from International Application No. PCT/KR2018/001072, dated Apr. 27, 2018.

Wang, Yiyi, et al., "Improvements in the mechanical properties of carbon nanotube fibers through graphene oxide interlocking." Carbon, vol. 98, 2016 (Received Aug. 18, 2015; Received in revised form Oct. 29, 2015; Available online Nov. 6, 2015), pp. 291-299.

Extended European Search Report including the Written Opinion for Application No. 18747647.8 dated May 7, 2019, 7 pages.

Yuping Sun et, al: "Water-Responsive Helical Graphene-Oxide Fibers Incorporating a Continuous Carbon Nanotube Network", Carbon., vol. 132, Feb. 23, 2018 (Feb. 23, 2018), pp. 394-400, XP055583730.

Zhaofeng Chen, "Inorganic Nonmetallic Materials Science", 2nd edition, Northwestern Polytechnical University Press, Feb. 2016, pp. 210-213 (English translation of the section cited in the Chinese Office Action).

* cited by examiner

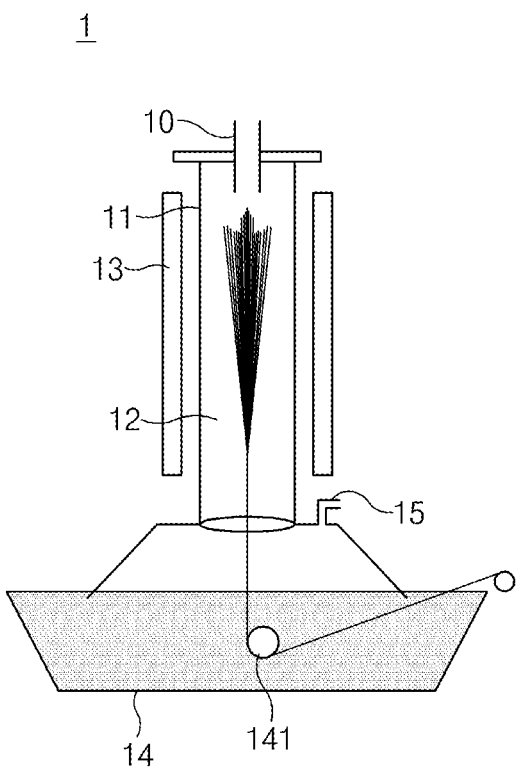

METHOD FOR PREPARING CARBON NANOTUBE FIBER AND CARBON NANOTUBE FIBER PREPARED THEREBY

CROSS-REFERENCE TO RELATED APPLICATION

The present application is a national phase entry under 35 U.S.C. § 371 of International Application No. PCT/KR2018/001072 filed on Jan. 24, 2018, which claims priority from Korean Patent Application No. 10-2017-0015343, filed on Feb. 3, 2017, the disclosures of which are incorporated herein by reference.

TECHNICAL FIELD

The present invention relates to a method for preparing a carbon nanotube fiber capable of enhancing tensile strength and a carbon nanotube fiber prepared thereby.

BACKGROUND ART

Carbon nanotubes (CNTs) are allotropes of carbon, and materials having a diameter of several to tens of nanometers and a length of hundreds of micrometers to several millimeters. Since such carbon nanotubes have been reported in 1991 by Dr. Iijima in the journal Nature, due to excellent thermal, electrical and physical properties, and a high aspect ratio, research on these materials have been conducted in various fields. The intrinsic characteristics of the carbon nanotubes result from the $sp^2$ hybridization of carbon atoms, and the carbon nanotubes are stronger than iron, lighter than aluminum, and exhibit similar electroconductivity to metals.

Carbon nanotubes are largely categorized as single-wall carbon nanotubes (SWNTs), double-wall carbon nanotubes (DWNTs) and multi-wall carbon nanotubes (MWNTs) according to the number of walls of nanotubes, and according to asymmetry/rolling angle (chirality), divided into a zigzag structure, an armchair structure, and a chiral structure. Until now, most studies have been frequently conducted to disperse powder-type carbon nanotubes for use as a reinforcing agent of a composite material, or to prepare a transparent and conductive film using a carbon nanotube dispersion solution, and the carbon nanotubes have already been commercialized in some fields.

However, to use carbon nanotubes in a composite material and a transparent and conductive film, dispersion of carbon nanotube is important, and due to the cohesion generated by a strong van der Waals force of carbon nanotubes, it is not easy to disperse the carbon nanotubes at a high concentration and maintain dispersibility. In addition, in the case of a composite material using carbon nanotubes as a reinforcing material, it is difficult to sufficiently express excellent properties of the carbon nanotubes.

Therefore, in recent years, a variety of studies for preparing a carbon nanotube fiber have been conducted to manufacture a carbon nanotube structure sufficiently expressing properties of the carbon nanotubes.

Among the methods for fiberizing a carbon nanotube, direct spinning is a method for obtaining a fiber by injecting a gas- or liquid-phase carbon source, a catalyst and a promoter precursor, along with a carrier gas, into an upper inlet of a vertically standing high-temperature heating furnace to synthesize carbon nanotubes in the heating furnace, and winding-up carbon nanotube aggregates, which flows down in the heating furnace with the carrier gas, inside or outside the heating furnace.

In the case of the carbon nanotube fiber prepared by the method described above, there is no direct interaction between carbon nanotube aggregates, which are components of a carbon nanotube fiber. For this reason, when tension is applied to the carbon nanotube fiber, the carbon nanotube aggregates slide, such that the fiber is broken. Accordingly, to enhance the tensile strength of the carbon nanotube fiber, research for forming a specific bond between the carbon nanotube aggregates is progressing.

DISCLOSURE

Technical Problem

The present invention provides a method for preparing a carbon nanotube fiber capable of enhancing tensile strength and carbon nanotubes prepared thereby.

Technical Solution

To solve the above-mentioned problem, the present invention provides a method for preparing a carbon nanotube fiber, which comprises: preparing carbon nanotube aggregates from a carbon source in the presence of a catalyst and a catalytic activator (S1); contacting the carbon nanotube aggregates with graphene oxide (S2); and fiberizing the carbon nanotube aggregates in contact with the graphene oxide (S3).

In addition, the present invention provides carbon nanotubes prepared by the method for preparing a carbon nanotube fiber.

Advantageous Effects

According to a method for preparing a carbon nanotube fiber of the present invention, since carbon nanotubes are in contact with graphene oxide in a process of preparing a carbon nanotube fiber, the graphene oxide may not only be present on the surface of the carbon nanotube fiber, but also can easily penetrate inside the carbon nanotubes constituting the carbon nanotube fiber. Therefore, the tensile strength of each carbon nanotube constituting the carbon nanotube fiber is enhanced, the binding force between carbon nanotubes is increased due to the graphene oxide present on the carbon nanotube surface, and thus the tensile strength of the carbon nanotube fiber, which is the final product, can be considerably enhanced. In addition, as a successive process of the preparation of a carbon nanotube aggregates and the contact with the graphene oxide can be implemented using a conventional apparatus for preparing a carbon nanotube fiber without a separate apparatus and an additional process, the preparation time is reduced, and the process is easily performed.

BRIEF DESCRIPTION OF DRAWINGS

The FIGURE is a schematic diagram of an apparatus for preparing a carbon nanotube fiber to perform a method for preparing a carbon nanotube fiber according to an exemplary embodiment of the present invention.

MODES OF THE INVENTION

Hereinafter, the present invention will be described in further detail to help in understanding of the present invention.

The terms and words used in the specification and the claims should not be interpreted as being limited to conventional or literal meanings, but should be interpreted with meanings and concepts which are consistent with the technological scope of the invention based on the principle that the inventors have appropriately defined concepts of terms in order to describe the invention in the best way.

Meanwhile, a preparation apparatus used in a method for preparing a carbon nanotube fiber according to an exemplary embodiment of the present invention may be any apparatus that can be used in the art of the present invention without particular limitation, and examples will be described with reference to the Figure to help in understanding of the present invention.

Referring to the FIGURE, a preparation apparatus 1 which is used in a method for preparing a carbon nanotube fiber of the present invention may include a reactor 10 which includes a reaction zone 12, an inlet 11 which is located at an upper portion of the reactor 10, a heating means 13 which serves to heat the reactor 10, a water vessel 14 which is located at a lower portion of the reactor 10 and serves to discharge carbon nanotubes, and an outlet 15 which is located at a lower portion of the reactor 10 and serves to discharge an unreacted gas. In addition, a winding means 141 which is located in the water vessel 14 and facilitates the recovery of the carbon nanotubes may be included.

The method for preparing a carbon nanotube fiber according to an exemplary embodiment of the present invention comprises preparing a carbon nanotube aggregates from a carbon source in the presence of a catalyst and a catalytic activator (S1).

Step S1 may be performed in the reaction zone 12 in the reactor 10. Specifically, the catalyst and the catalytic activator may be injected into the reaction zone 12, and a gaseous (hereinafter, referred to as "gas-phase") carbon source, or a gas-phase carbon source and a mixed gas of a reducing gas (e.g., hydrogen, etc.) and a carrier gas (e.g., nitrogen, etc.) may be injected into the reactor through the inlet 11 at a temperature that is at least a pyrolysis temperature of the gas-phase carbon source and at most the melting temperature of the catalyst. A carbon nanotube may be prepared from the injected gas-phase carbon source. Specifically, a carbon nanotube aggregates may be prepared by growing the carbon nanotube aggregates by chemical vapor synthesis through decomposition of the gas-phase carbon source. The carbon nanotube aggregates prepared by such chemical vapor synthesis has a growth direction almost parallel to a tube axis, and high crystallinity of a graphite structure in a tube length direction. As a result, a unit body has a smaller diameter, and electroconductivity and strength are high.

In addition, the chemical vapor synthesis may be performed at 1,000° C. or more, and specifically, 1,000 to 1,500° C., and more specifically, 1,100 to 1,300° C. To satisfy the above-mentioned temperature, the temperature of the reaction zone 12 may be elevated by the heating means 13. When the above-mentioned temperature is satisfied, the growth rate of the carbon nanotube aggregates may be increased, and the crystallinity and strength of the carbon nanotube aggregates may be enhanced.

In addition, the catalyst may be any catalyst that can be used in preparation of the carbon nanotube aggregates without particular limitation, and may be one or more selected from the group consisting of a ferrocene-containing metallocene, iron, nickel, cobalt, platinum, ruthenium, molybdenum, vanadium and oxides thereof. The catalyst activator may be any activator that can be used in preparation of the carbon nanotube aggregates without particular limitation, and may be sulfur (S) or thiophene ($C_4H_4S$).

As the carbon source, any one that can provide carbon and be present in a gas phase at 300° C. or more can be used without particular limitation. Specifically, the carbon source may be a carbon-based compound having 6 carbon atoms or less, and more specifically, may be one or more selected from the group consisting of carbon monoxide, methane, ethane, ethylene, ethanol, acetylene, propane, propylene, butane, butadiene, pentane, pentene, cyclopentadiene, hexane, cyclohexane, benzene and toluene.

The method for preparing a carbon nanotube fiber according to an exemplary embodiment of the present invention comprises contacting the carbon nanotube aggregates with graphene oxide (S2).

Specifically, the carbon nanotube aggregates prepared in Step S2 may be discharged to the outside through the water vessel 14 containing a dispersion solution in which graphene oxide is dispersed to separate a reducing gas and a carrier gas from the carbon nanotube aggregates and to allow the carbon nanotube aggregates to be in contact with graphene oxide.

More specifically, right after the carbon nanotube aggregates are prepared, that is, before the inside of each carbon nanotube constituting the carbon nanotube aggregates becomes dense, the carbon nanotube aggregates may be brought into contact with the graphene oxide. Accordingly, a large pore through which the graphene oxide can penetrate may be present in the carbon nanotube, and the graphene oxide may easily penetrate into and may remain in the pore present in each carbon nanotube. Therefore, the tensile strength of each carbon nanotube aggregate constituting a carbon nanotube fiber may be considerably enhanced.

In addition, since the graphene oxide may easily penetrate between individual carbon nanotubes constituting the carbon nanotube aggregates, graphene oxide may be present on the surface of each carbon nanotube constituting the aggregates. Due to the graphene oxide, the binding strength between carbon nanotubes may be increased, and thus the tensile strength of a carbon nanotube fiber, which is the final product, may be considerably enhanced.

The carbon nanotube aggregates and the graphene oxide may be in contact with each other for 1 second to 5 minutes, and specifically 1.2 seconds to 2 minutes. When the above-mentioned condition is satisfied, the graphene oxide may sufficiently penetrate between the individual carbon nanotube aggregates, as well as into the carbon nanotube aggregates, and remain therein.

Meanwhile, the graphene oxide may have an average particle size of 10 to 1,000 nm, specifically 10 to 500 nm, and more specifically 40 to 100 nm. When the above-mentioned range is satisfied, the graphene oxide may effectively penetrate into and remain in each carbon nanotube constituting the carbon nanotube aggregates, specifically, in the pore. To allow the graphene oxide to have the above-mentioned average particle size, a grinding process may be performed, and the grinding process may be a conventional grinding process such as ball milling.

The dispersion solution may be an aqueous solution that contains the graphene oxide at 10 to 5,000 mg/L, specifically 10 to 100 mg/L, and more specifically 10 to 50 mg/L. When the above-mentioned range is satisfied, a proper amount of the graphene oxide may easily penetrate into and remain in a carbon nanotube. In addition, the inside and surface of carbon nanotubes may be uniformly coated with the graphene oxide.

Meanwhile, the carbon nanotube aggregates may be collected using a winding means 141 present in the water vessel 14, and then discharged from the apparatus 1. The winding means 141 may be one or more selected from the group consisting of a spin, a reel, a drum and a conveyer.

The method for preparing a carbon nanotube fiber according to an exemplary embodiment of the present invention comprises fiberizing the carbon nanotube aggregates in contact with the graphene oxide (S3).

The method for fiberizing a carbon nanotube aggregates is not particularly limited as it may be performed in the art of the present invention, and may be contraction, extension, or twisting.

The method for preparing a carbon nanotube fiber according to an exemplary embodiment of the present invention may further comprise thermally treating the carbon nanotube fiber between Step S2 and Step S3.

The thermal treatment may be performed in an oxygen-containing atmosphere, and specifically in an atmosphere containing 20 vol % or more of oxygen.

In addition, the thermal treatment may be performed at 150 to 500° C., specifically 200 to 400° C., and more specifically 200 to 300° C. When the above-mentioned range is satisfied, the carbon nanotube surface may be partially oxidized, and a functional group such as a hydroxyl group (—OH) may be formed on the surface of the oxidized carbon nanotube. Functional groups formed on the carbon nanotube surface may bond with functional groups on the graphene oxide surface by hydrogen bonds, and therefore, the tensile strength of a carbon nanotube fiber, which is the final product, may be enhanced.

Meanwhile, when thermal treatment is performed in an inert gas atmosphere instead of an oxygen-containing atmosphere, the carbon nanotube surface is not oxidized, and thus the degree of enhancement of the tensile strength of the carbon nanotube fiber may be insignificant. Accordingly, it may be preferable to regulate the thermal treatment atmosphere when possible.

A carbon nanotube fiber according to another exemplary embodiment of the present invention is prepared by the method for preparing a carbon nanotube fiber, and comprises carbon nanotubes containing graphene oxide on the surface thereof and therein. As a result, compared to a conventional carbon nanotube fiber in which graphene oxide is present only on its surface, the carbon nanotube fiber of the present invention has significantly superior tensile strength.

EXAMPLES

Hereinafter, examples of the present invention will be described in detail so as to be easily carried out by those of ordinary skill in the art to which the present invention pertains. However, the present invention may be implemented in a variety of different forms, and is not limited to the examples which will be described herein.

Examples 1 to 6, and Comparative Examples 1 to 3

Preparation of Carbon Nanotube Fiber

A carbon nanotube fiber was prepared by the following method using an apparatus for preparing a carbon nanotube fiber, which includes a reactor main body including a reaction zone; an inlet which is located at an upper portion of the main body, and allows the flow of a carbon source and a carrier gas into the reaction zone; a heating means which serves to heat the reaction zone; and a water vessel equipped at a lower portion of the main body to discharge a carbon nanotube fiber to the outside of the apparatus.

A temperature in the reaction zone was elevated to 1,200° C. under a nitrogen atmosphere. $Fe(C_5H_5)_2$ as a catalyst precursor and sulfur (S) as a catalytic activator were put into the reaction zone adjacent to the inlet. $Fe(C_5H_5)_2$ and the catalytic activator S were added by vaporization at average rates of 0.07 g/hr and 0.02 g/hr, respectively, and synthesis was performed for 3 hours by feeding methane as a carbon source at a gas hourly space velocity (GHSV) of 2.0 $hr^{-1}$ and hydrogen and nitrogen as carrier gases at GHSVs of 25 $hr^{-1}$ and 13 $hr^{-1}$, respectively, thereby obtaining a carbon nanotube aggregates.

The GHSV refers to a ratio of the flow volume of the supplied gas to the volume of the reactor, which is measured under standard conditions (0° C., 1 bar) and is a value expressed in hours as a unit time.

The carbon nanotube aggregates was passed through the water vessel containing an aqueous solution in which graphene oxide was contained at a content shown in Table 1 below for 0.5 minutes to be discharged to the outside of the apparatus for preparing a carbon nanotube fiber. Subsequently, the carbon nanotube fiber was obtained through thermal treatment under the conditions described in Table 1 below.

TABLE 1

| Classification | Concentration of graphene oxide (mg/L) | Thermal treatment conditions | | |
|---|---|---|---|---|
| | | Atmosphere | Temperature (° C.) | Time (min) |
| Example 1 | 10 | — | — | — |
| Example 2 | 20 | — | — | — |
| Example 3 | 10 | $O_2:N_2$ = 21:79 (volume ratio) | 250 | 30 |
| Example 4 | 20 | $O_2:N_2$ = 21:79 (volume ratio) | 250 | 30 |
| Example 5 | 10 | Ar atmosphere | 250 | 30 |
| Example 6 | 20 | Ar atmosphere | 250 | 30 |
| Comparative Example 1 | — | — | — | — |
| Comparative Example 2 | — | $O_2:N_2$ = 21:79 (volume ratio) | 250 | 30 |
| Comparative Example 3 | — | Ar atmosphere | 250 | 30 |

Comparative Example 4

Preparation of Carbon Nanotube Fiber Composite

A carbon nanotube fiber composite was prepared by immersing the carbon nanotube fiber of Comparative Example 1 in an aqueous solution containing 100 mg/L of graphene oxide for 12 hours and drying the resulting solution at room temperature under atmospheric pressure.

Experimental Example 1

Evaluation of Characteristics of Carbon Nanotube Fiber and Carbon Nanotube Fiber Composite The tensile strengths of carbon nanotube fibers of Examples 1 to 6 and Comparative Examples 1 to 3 and a carbon nanotube fiber composite of Comparative Example 4 were measured using FAVIMAT+ (Manufacturer: TEXTECHNO). The linear density of the fibers was measured according to ASTM D1577, and after a fiber tensile test, the breaking strength of a fiber was divided by the linear density, thereby measuring the tensile strength. Detailed measurement conditions are as follows. Based on Comparative Example 1, the tensile strengths were evaluated as relative values with respect to Comparative Example 1, and the values are shown in Table 2 below.

Measurement conditions: a load cell of 210 cN, a Gauge length of 2 cm, and a speed of 2 mm/min

TABLE 2

| Division | Tensile strength |
|---|---|
| Example 1 | 118.3 |
| Example 2 | 133.6 |
| Example 3 | 138.9 |
| Example 4 | 167.9 |
| Example 5 | 129.0 |
| Example 6 | 126.0 |
| Comparative Example 1 | 100.0 |
| Comparative Example 2 | 94.7 |
| Comparative Example 3 | 110.7 |
| Comparative Example 4 | 63.6 |

Referring to Table 2, in the case of the carbon nanotube fibers of Examples 1 to 6 according to the present invention, compared with the carbon nanotube fibers of Comparative Examples 1 to 3, it was seen that the tensile strengths are significantly superior. In addition, after the carbon nanotube fibers were prepared, compared with the carbon nanotube fiber composite of Comparative Example 4 mixed with graphene oxide, it was seen that the carbon nanotube fibers of Examples 1 to 6 have significantly superior tensile strengths.

In addition, in the case of the carbon nanotube fibers of Examples 1 to 6, it was seen that the tensile strengths became much higher when being in contact with an aqueous solution containing a high concentration of graphene oxide. In addition, when thermal treatment was further performed after the carbon nanotube fibers were brought into contact with the graphene oxide, it can be seen that the tensile strengths were further improved, and specifically, the tensile strength was further improved as the thermal treatment was performed in an atmosphere containing oxygen, relative to an argon atmosphere.

DESCRIPTIONS OF REFERENCE NUMERALS

1: Apparatus for preparing carbon nanotube fiber
10: Reactor
11: Inlet
12: Reaction zone
13: Heating means
14: Water vessel
141: Winding means
15: Outlet

The invention claimed is:

1. A method for preparing a carbon nanotube fiber, comprising:
    reacting a carbon source in the presence of a catalyst and a catalytic activator to form carbon nanotube aggregates;
    contacting the carbon nanotube aggregates with graphene oxide; and
    forming the carbon nanotube aggregates in contact with the graphene oxide into a carbon nanotube fiber, wherein the graphene oxide has an average particle size of 10 nm to 1,000 nm; and
    thermally treating the carbon nanotube fiber in an oxygen-containing atmosphere.

2. The method of claim 1, wherein the contacting step further comprises: passing the carbon nanotube aggregates through a dispersion solution comprising the graphene oxide.

3. The method of claim 2, wherein the dispersion solution comprises the graphene oxide at 10 mg/L to 5,000 mg/L.

4. The method of claim 1, wherein the thermal treatment is performed at 150° C. to 500° C.

5. The method of claim 1, wherein the reacting step further comprises:
    providing gases of the carbon source, the catalyst, and the catalyst precursor to a heated reaction zone; and
    reacting the carbon source in the presence of the catalyst and the catalyst precursor in the heated reaction zone to form the carbon nanotube aggregates.

* * * * *